(12) United States Patent
Farid et al.

(10) Patent No.: US 8,556,210 B2
(45) Date of Patent: *Oct. 15, 2013

(54) METHOD OF CONTROLLING A BRUSHLESS DC MOTOR

(75) Inventors: Anas Farid, Boulogne-Billancourt (FR); Etienne Annee, Courbevoie (FR)

(73) Assignee: Messier-Bugatti-Dowty, Velizy-Villacoublay (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/311,729

(22) Filed: Dec. 6, 2011

(65) Prior Publication Data

US 2012/0138742 A1 Jun. 7, 2012

(30) Foreign Application Priority Data

Dec. 6, 2010 (FR) ..................................... 10 60095

(51) Int. Cl.
*B64C 25/32* (2006.01)

(52) U.S. Cl.
USPC .......................... 244/103 R; 244/50; 244/99.2

(58) Field of Classification Search
USPC .............. 244/50, 103 R, 103 S, 51, 111, 99.2
See application file for complete search history.

(56) References Cited

U.S. PATENT DOCUMENTS

| | | | | |
|---|---|---|---|---|
| 3,095,163 A | * | 6/1963 | Hill | 244/12.1 |
| 3,253,278 A | * | 5/1966 | Lucchi | 342/47 |
| 3,977,631 A | * | 8/1976 | Jenny | 244/50 |
| 4,865,162 A | * | 9/1989 | Morris et al. | 188/72.8 |
| 5,050,940 A | * | 9/1991 | Bedford et al. | 303/166 |
| 6,095,293 A | * | 8/2000 | Brundrett et al. | 188/72.1 |
| 6,402,259 B2 | * | 6/2002 | Corio et al. | 303/20 |
| 6,860,464 B1 | * | 3/2005 | Quitmeyer et al. | 251/14 |
| 7,594,626 B2 | * | 9/2009 | Soderberg | 244/103 S |
| 7,703,717 B2 | * | 4/2010 | Soderberg | 244/103 S |
| 8,136,755 B2 | * | 3/2012 | Hadley et al. | 244/50 |
| 2004/0051619 A1 | * | 3/2004 | Bryan | 336/192 |
| 2004/0239173 A1 | * | 12/2004 | Williams et al. | 303/3 |
| 2007/0051847 A1 | * | 3/2007 | Quitmeyer et al. | 244/99.2 |
| 2007/0262644 A1 | * | 11/2007 | Foch et al. | 307/29 |
| 2008/0258548 A1 | * | 10/2008 | May et al. | 303/139 |
| 2009/0192667 A1 | * | 7/2009 | Burreson et al. | 701/31 |
| 2009/0314562 A1 | * | 12/2009 | Soderberg | 180/65.51 |
| 2010/0127647 A1 | | 5/2010 | Huang et al. | |
| 2011/0040466 A1 | * | 2/2011 | Hill et al. | 701/74 |

FOREIGN PATENT DOCUMENTS

| | | |
|---|---|---|
| EP | 0 114 276 A1 | 8/1984 |
| EP | 1 300 936 A2 | 4/2003 |
| FR | 2 738 419 A1 | 3/1997 |

* cited by examiner

*Primary Examiner* — Christopher P Ellis
*Assistant Examiner* — Medhat Badawi
(74) *Attorney, Agent, or Firm* — Sughrue Mion, PLLC

(57) ABSTRACT

The invention relates to a method of powering at least one brushless DC electric motor having a plurality of phases for powering, the method including the steps of associating a static contactor with the motor for taking input voltage pulses and delivering polyphase voltage pulses to the motor in a manner that is servo-controlled to the angular position of the rotor of the motor, and for generating from a DC voltage source voltage pulses of frequency that is fixed and at a duty ratio that is controllable, thereby forming the input voltage pulses to the static contactor.

4 Claims, 1 Drawing Sheet

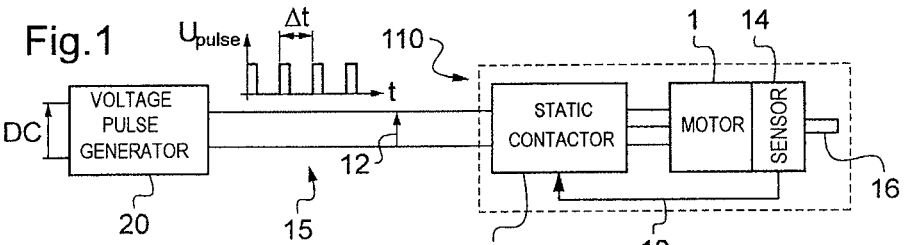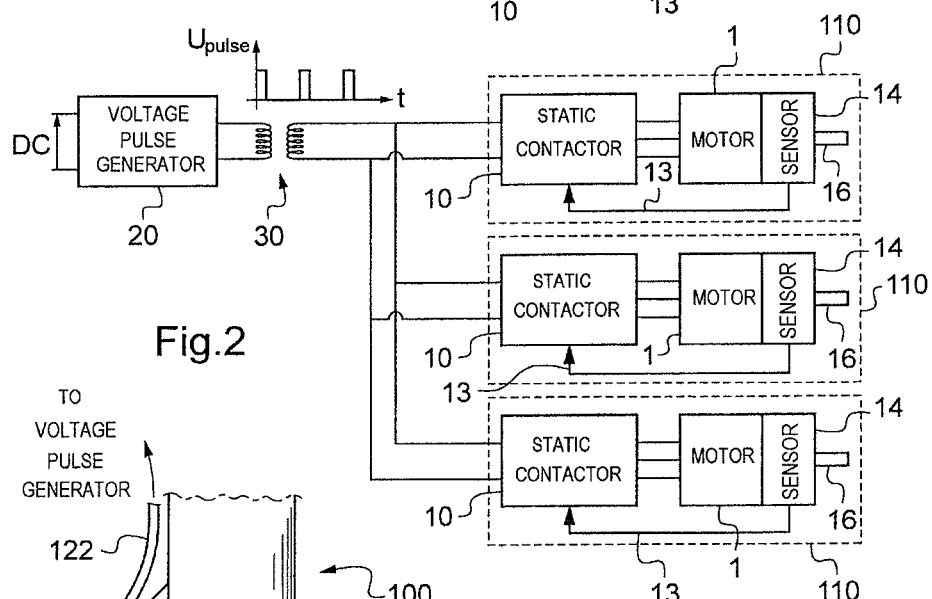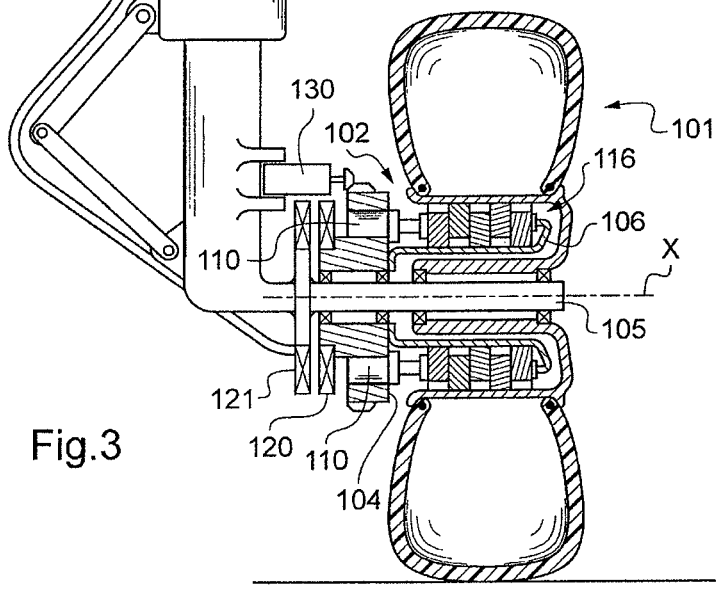

METHOD OF CONTROLLING A BRUSHLESS DC MOTOR

The invention relates to a method of controlling a brushless direct current (DC) motor.

TECHNOLOGICAL BACKGROUND OF THE INVENTION

Such motors are generally controlled by means of a static converter that is connected to a DC voltage source and that delivers voltages for each of the phases of the motor, e.g. by means of power transistors that are controlled to switch on and off in a manner that is servo-controlled to the angular position of the rotor of the motor. For this purpose, the motor is generally fitted with means for measuring its angular position, which means deliver a signal that is representative of said position, the signal being used by the static converter to switch the power transistors on and off so as to perform the automatic synchronous switching function that is performed by the commutator in a motor with brushes.

It is also appropriate to adapt the voltage that is delivered to the level of power or torque that is required. For this purpose, the static converter is generally controlled to vary the voltage delivered to the motor as a function of the mechanical power or the torque that it is supposed to deliver. Thus, in response to a power or torque setpoint, the static converter sends a variable voltage to the motor so as to enable the motor to develop the requested power or torque. For this purpose, various voltage-varying methods are known, such as for example pulse width modulation (PWM).

Control arrangements are also known that include a static contactor associated with an angle position sensor for controlling power transistors, the static contactor then not performing the voltage-varying function of static converters, but only the synchronizing function. The voltage is varied by means of an upstream DC/DC converter that delivers a variable DC voltage to the static contactor.

OBJECT OF THE INVENTION

An object of the invention is to provide another way of powering a brushless DC motor.

SUMMARY OF THE INVENTION

To this end, the invention provides a method of powering at least one brushless DC electric motor having a plurality of phases for powering, the method comprising the steps of:
  associating a static contactor with the motor for the purpose of taking an input voltage and delivering to the motor a polyphase voltage in a manner that is servo-controlled to the angular position of the rotor of the motor; and
  using a DC voltage source to generate voltage pulses of frequency that is fixed and of duty ratio that is controllable so as to form the input voltage to the static contactor.

The arrangements of the invention present numerous advantages:
  the static contactor associated with the motor is very simple, since it serves only to perform the sequencing of the phase voltages, and not to vary them. It may be arranged as close as possible to the motor, and may even be incorporated directly therein, with a rotor angle position sensor being integrated therein and delivering a signal that is used directly by the static contactor. The static contactor can be thought of as replacing the commutator and the brushes of a motor having brushes;
  the input voltage generator may also be very simple, since it delivers a single-phase voltage at a frequency that is fixed. Only the duty ratio of the pulses is variable, and that is technologically very simple to implement; and
  the static contactor and the voltage pulse generator may be physically remote from each other, and may be connected together by means suitable for transmitting voltage pulses at fixed frequency. In particular, the voltage pulses may be transmitted via a transformer, thereby achieving electrical isolation.

DESCRIPTION OF THE FIGURES

The invention can be better understood in the light of the following description of a particular embodiment of the invention given with reference to the accompanying figures, in which:

FIG. 1 is a diagrammatic view of a device enabling the method of the invention to be implemented;

FIG. 2 is a diagrammatic view of a device analogous to that of FIG. 1 for powering a plurality of motors; and FIG. 3 is a section view of the bottom portion of an aircraft undercarriage with electromechanical brakes implementing the method of the invention.

DETAILED DESCRIPTION OF THE INVENTION

With reference to FIG. 1, the method is used for powering an electric motor 1 of the brushless DC type. According to the invention, the motor 1 is associated with a static contactor 10 having controllable switches that interrupt an input voltage 12 in order to deliver it to phases of the motor 1 as a function of information 13 concerning the angular position of the motor, as delivered by an angular position sensor 14. The sole function of the static contactor 10 is to interrupt the input voltage in order to generate voltage for the phases. The controllable switches may be thyristors, for example.

Still according to the invention, the input voltage 12 is a pulsed voltage $U_{pulse}$, that is generated by a voltage pulse generator 20 from a DC source voltage. The voltage pulse generator 20 is preferably a chopper having controlled switches that convert the DC voltage source into a pulsed single-phase voltage at a fixed frequency (in the diagram of the figure there can be seen the equivalent period $\Delta t$ that is of constant duration), but of duty ratio that is controllable in order to produce voltage pulses of controllable mean value, e.g. as a function of a force setpoint delivered to the pulse generator 20.

Where appropriate, it is possible to provide a filter stage at the input to the static contactor 10 for the purpose of smoothing the input voltage before applying it to the controlled switches of the static contactor.

The static contactor 10 and the sensor 14 are preferably located in the immediate proximity of the motor, or indeed incorporated therein. The assembly arranged in this way and shown symbolically in the figure by a dashed-line rectangle, has only two input wires for supplying it with the input voltage pulses.

The voltage pulses may be transmitted from the voltage pulse generator 22 to the static contactor 10 by means of cables 15, as shown. They could also be transmitted, as shown in FIG. 2, by means of a single-phase transformer 30 providing electrical isolation between these two elements. Given the frequency of the input voltage 12 (typically of the order of 100 kilohertz (kHz)), the transformer may be very compact.

As shown in FIG. 2, the voltage pulses are easily transmitted by means of the transformer to a plurality of assemblies each comprising a motor plus a static contactor plus an angle position sensor.

The invention is particularly adapted for application to electromechanical aircraft brakes. Indeed, as suggested in document U.S. Pat. No. 3,977,631, it is advantageous to provide a brake on an undercarriage in which the ring, i.e. the part that supports the actuators, and the associated torsion tube are mounted on the corresponding axle with the possibility of rotating. By controlling the braking actuators in such a manner as to compress the stack of disks and thereby constrain the ring to rotate with the wheel, this arrangement enables rotation of the wheel to be controlled by causing the ring to rotate by using a motor member.

In the above-mentioned document, the actuators are hydraulic actuators. Powering them while the ring is rotating therefore requires a hydraulic circuit to be provided that has a rotary coupling compatible with rotation of the ring.

As shown in FIG. 3, that teaching may be applied to an undercarriage 100 having wheels 101 with brakes 102 that are fitted with electromechanical braking actuators 110 that are carried by the ring 104. Here the ring 104 is mounted to rotate on the axle 105 that receives the wheel 101. Each of the actuators 110 is fitted with a brushless DC motor that is associated, in accordance with the invention, with a static contactor and with an angle position sensor, these two elements being arranged directly in the actuator. The motor is used for selectively moving a pusher 16 of the actuator facing a stack of friction disks 116 in order to press the disks together in selective manner, by means of a transformation member transforming the rotary movement of the motor into linear movement of the pusher. The assembly forms an integrated actuator that can be removed as a unit from the ring 104.

The ring 104 is secured to a torsion tube 106 that rotates with the ring 104. The friction disks 116 comprise disks that are constrained in rotation with the wheel 101 alternating with disks that are constrained in rotation with the torsion tube 106.

In a particular arrangement of the invention, the ring 104 carries the secondary 120 of a transformer having its primary 121 fastened to the undercarriage facing the secondary. The primary 121 is connected by means of a cable 122 extending along the undercarriage to a voltage pulse generator that is mounted in the fuselage of the aircraft, in this example. The transformer transmits these voltage pulses to the integrated actuators 110. As before, these voltage pulses are interrupted and sequenced by the static contactors of the actuators in order to power the phases of the associated motors as a function of the angular positions of the rotors of the motors.

Because of this contactless connection, the integrated actuators 110 can be powered while the ring is rotating, without any need for rotary contacts.

In order to control rotation of the ring 104 in selective manner, a motor 130 for driving the ring 104 in rotation is arranged on the bottom portion of the undercarriage and co-operates in this example with the ring by means of a bevel gear connection.

These arrangements make several modes of operation possible:

a first mode of operation during which the ring 104 is prevented from rotating, the integrated actuators 110 then being powered by the transformer having its primary 121 and its secondary 120 stationary relative to each other, thereby serving to press the brake disks together and thus slow down rotation of the wheel. This is the conventional braking mode;

a second mode of operation in which the ring 104 is driven in rotation by the motor 130. In order to drive the wheel in rotation, it is then appropriate to power the integrated actuators 110 via the transformer, with its secondary 120 then rotating in register with the primary 121. This is independent taxiing mode, enabling the aircraft to move without using its engines; and a third mode of operation in which the ring 104 is driven in rotation by the motor 130, without the integrated actuators 110 being powered. This is a mode of operation for verifying proper operation of the motor member.

The invention is not limited to the above description, but on the contrary covers any variant coming within the ambit defined by the claims.

What is claimed is:

1. An integrated electromechanical brake actuator comprising:
   a brushless DC electric motor having a rotor;
   a linearly-movable pusher mechanically connected to the motor to move in response to rotation of the motor;
   a static contactor for delivering a polyphase voltage to the motor by interrupting and sequencing input voltage pulses as a function of information relating to an angular position of the rotor of the motor; and
   an angle position sensor for sensing the angular position of the rotor and delivering angular position information.

2. An aircraft undercarriage including at least one axle receiving at least one wheel fitted with an electromechanical brake, the brake including at least one brake actuator according to claim 1.

3. An aircraft undercarriage according to claim 2, wherein the brake further comprises a transformer, having a secondary and a primary, and a ring receiving the at least one brake actuator, said ring being mounted to rotate on the axle, the ring carrying the secondary of a transformer, wherein the primary is carried by the undercarriage in register with the secondary, the transformer being arranged to transmit the voltage pulses to the actuator(s) that are electrically connected to the secondary of the transformer.

4. An undercarriage according to claim 2, wherein the brake further comprises a ring that receives the at least one brake actuator and that is mounted to rotate on the axle, rotation of the ring being controlled in a selective manner by means of an electric motor arranged on the undercarriage.

* * * * *